United States Patent [19]

Davis

[11] Patent Number: 5,052,943

[45] Date of Patent: Oct. 1, 1991

[54] RECHARGING AND DATA RETRIEVAL APPARATUS

[75] Inventor: Patrick H. Davis, Cedar Rapids, Iowa

[73] Assignee: Norand Corporation, Cedar Rapids, Iowa

[21] Appl. No.: 551,663

[22] Filed: Jul. 10, 1990

Related U.S. Application Data

[63] Continuation of Ser. No. 327,660, Mar. 23, 1989, abandoned.

[51] Int. Cl.$^5$ .................. H01M 10/46; H01R 13/627
[52] U.S. Cl. ........................................ 439/357; 320/2; 439/298; 439/660; 439/929
[58] Field of Search ............... 439/297, 298, 357, 358, 439/377, 929, 76, 862, 660; 320/2, 4, 5, 20, 25, 57; 455/89, 346, 348, 349, 90

[56] References Cited

U.S. PATENT DOCUMENTS

| | | | |
|---|---|---|---|
| 3,143,697 | 8/1964 | Springer | 320/2 |
| 3,348,116 | 10/1967 | Freeman | 320/2 |
| 3,390,319 | 6/1968 | Robison | 320/2 |
| 4,141,616 | 2/1979 | Gottlieb | 320/2 |
| 4,345,147 | 8/1982 | Aaron et al. | 235/385 |
| 4,397,513 | 8/1983 | Clark et al. | 439/357 |
| 4,460,120 | 7/1984 | Shepard et al. | 235/472 |
| 4,558,270 | 12/1985 | Liautaud et al. | 320/2 |
| 4,621,189 | 11/1986 | Kumar et al. | 235/472 |
| 4,629,962 | 12/1986 | Arakawa | 320/2 |
| 4,773,032 | 9/1988 | Uehara et al. | 364/709.04 |
| 4,801,786 | 1/1989 | Stobbe | 235/377 |
| 4,835,372 | 5/1989 | Gombrich et al. | 235/375 |
| 4,885,523 | 12/1989 | Koenck | 320/21 |
| 4,953,113 | 8/1990 | Chadima, Jr. et al. | 364/708 |

OTHER PUBLICATIONS

Norand Corporation Service Instruction Book NX1400 Quad Communication Rack, 1st Edition; Nov. 1987, FIG. 4-1, (pp. 4-3/4-4) and FIG. 4-2 (pp. 4-6 and 4-7/4-8).
Advertising Material, "Model 20 Hand-Held Computer", Norand Data Systems of Cedar Rapids, Iowa.
Advertising brochure, "Data Communications", Norand Data Systems of Cedar Rapids, Iowa.
Advertising material, "NT141G1 hand-Held Computer", Norand Data Systems of Cedar Rapids, Iowa.
Advertising material, "Battery Charging Accessories for Portable Radio Data Terminals", Norand Data Systems of Cedar Rapids, Iowa.
Advertising material, "Data Consolidator", Norand Data Systems of Cedar Rapids, Iowa.
Advertising material, "Route-Commander Portable Data System for Bakery Distribution", Norand Data Systems of Cedar Rapids, Iowa.

*Primary Examiner*—Neil Abrams
*Attorney, Agent, or Firm*—Neuman, Williams, Anderson & Olson

[57] ABSTRACT

Dock apparatus is provided for the receiving of portable, hand-held data retrieval devices to allow recharging of internal batteries and data communication with centralized computer systems. A frame having electrical contact elements at its inner end receives the hand-held device, which at its lower end is provided with electrical contact pads which engage the contact elements of the receiving frame when the hand-held device is fully inserted in the frame. Detents within the frame engage mating indentations in the hand-held device. The dock frames may be ganged in plural arrangements.

31 Claims, 4 Drawing Sheets

RECHARGING AND DATA RETRIEVAL APPARATUS

CROSS REFERENCE TO PRIOR APPLICATIONS

This is a continuation of application Ser. No. 07/327,660, filed Mar. 23, 1989 and now abandoned.

BACKGROUND OF THE INVENTION

This invention relates to apparatus for making electrical interconnections and in particular to methods of physically coupling a battery powered hand-held terminal device, or a plurality of them, to a recharging and data retrieval docking mechanism.

Along with the need to recharge the batteries of the data terminal is the requirement that the device be coupled to other data handling apparatus so that the collected data within the handheld data terminal may be electrically "read" by other devices, such as a mainframe computer or other type of central processing unit. This need has also been met by the use of connectors of the pin and socket variety which will mate with a complementing connector mounted to the exterior of the data terminal housing. The connector of the data terminal is electrically interconnected to the internal data carrying circuitry of the data collection terminal.

SUMMARY OF THE INVENTION

The present invention provides an improvement to the interconnection of hand-held or other portable data collection or data entry terminal devices with recharging apparatus and data interrogation apparatus.

In a preferred embodiment, a frame having an open end receives the body of a hand-held data entry terminal therein. Disposed within and mounted to the lowermost wall of the frame is a series of generally horizontally disposed, spaced apart series array of contact elements. The contact elements extend above the lower wall of the frame such that they will make contact engagement with a series array of contact pads disposed in spaced apart relationship and mounted to the exterior of the lower wall of the hand-held data entry terminal. The contact elements of the frame are resilient such that they will depress when they are engaged by the pads of the data entry terminal and will spring back when the data entry terminal is removed.

The frame comprises four generally upstanding walls with a lower wall enclosing the lower end of the frame. A plurality of detent protrusions depends from one or more of the upstanding walls and is disposed to engage mating indentations on the housing of the data entry terminal to be received. Each detent protrusion is stationed upon a yielding region of its respective upstanding wall, to facilitate the insertion into, and removal from, the frame, of a data entry terminal device.

The contact elements of the frame and the contact pads of the data entry terminal engage to provide separate electrical couplings when the data entry terminal is fully installed in the frame.

A plurality of frames may be ganged together to provide a series of recharging docks into which one or more data entry terminals may be selectively placed, independent of one another.

The frame is sized to snugly receive a data entry terminal and to prevent lateral movement thereof while the data entry terminal is stationed in the frame.

One object of the invention is to provide a dock into which a hand-held data terminal may be selectively placed for recharging and data intercommunication purposes, which provides electrical contact without the mating of pin and socket connections.

Another object of the invention is to provide a dock for hand-held data entry terminals which may be easily used by personnel having no training with data transmission.

Another object of the invention is to provide a recharging dock which may be ganged together with other docks to provide a recharging and data communication facility into which may be placed one or more data entry terminals independently of the others.

Another object of the invention is to provide a dock for data entry terminals which provides a self-releasing (non-latching) retention mechanism to retain the respective contacts of the series array of the terminals in touching engagement with the respective electrical contacts of the dock.

These and other objects will be apparent from the detailed description which follows.

DESCRIPTION OF THE DRAWING FIGURES

DETAILED DESCRIPTION OF THE INVENTION

Figure 1:
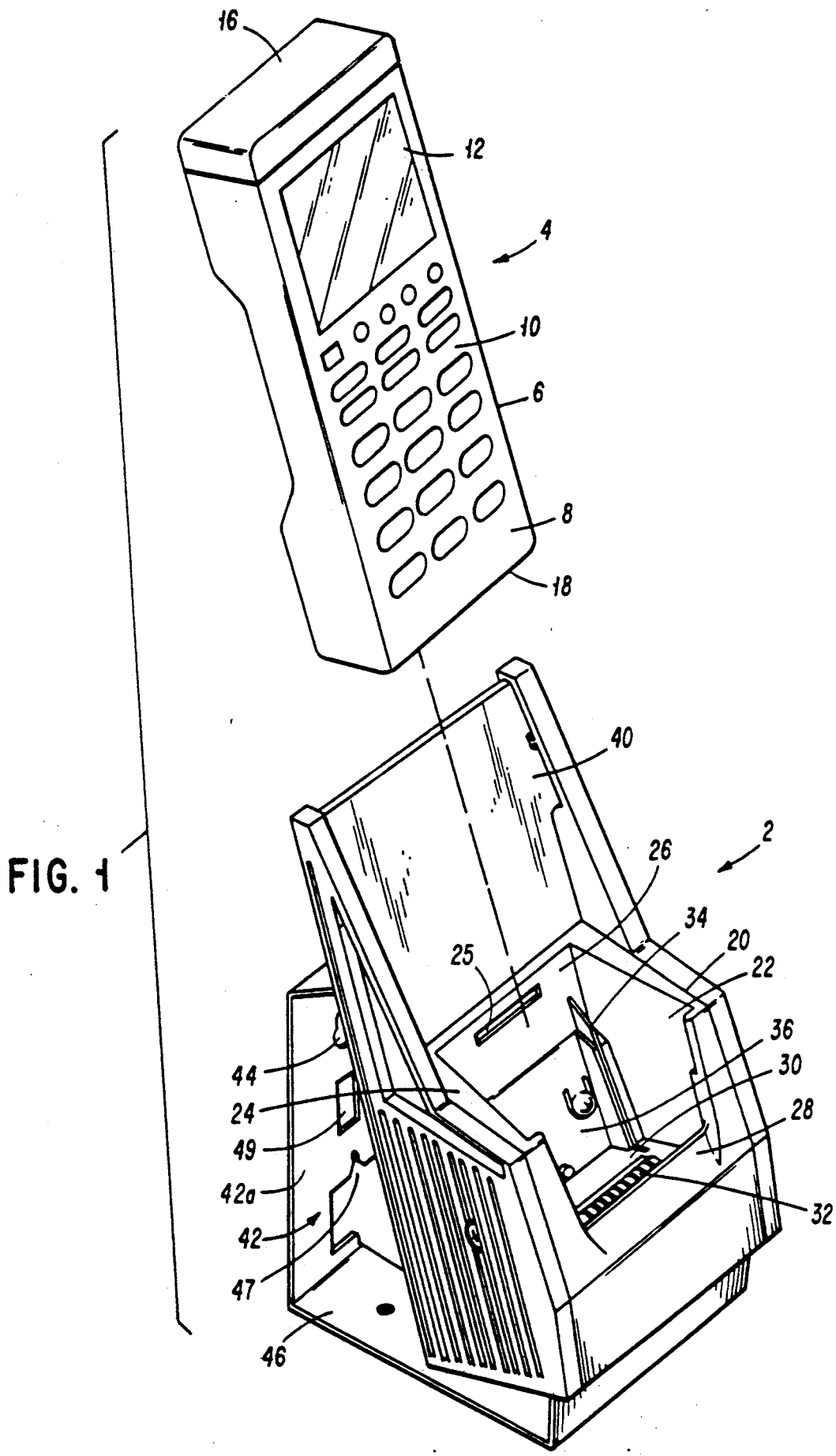
FIG. 1 is a perspective view of the preferred embodiment of the invention.

Referring now to the drawings, FIG. 1 discloses the preferred embodiment of the invention 2 in a perspective view, showing a data entry terminal 4 of the type insertable within invention 2. Data entry terminal 4 is provided with an elongated housing 6 having a front wall 8 generally orthogonally positioned to end walls 16 and 18. A keypad 10 and visual display 12 are provided on front wall 8 of housing 6. It is intended that data entry terminal 4 is a portable, preferably hand-held, data collection device which may be carried with the user such that the user may enter collected data by activation of the keys of keypad 10 or by other means, such as through bar code reading accessories, which are not illustrated in the drawings. Data entry terminal 4 may also provide data or instructions to the user by way of display 12, or display 12 may simply display to the user the data which is being entered through the keypad or other input means which may be used. Data entry terminal 4 may also be equipped to electromagnetically communicate by transmitted waves to other devices to gather and transmit data.

Devices such as data entry terminal 4 require electrical power to operate, such power generally being provided by rechargeable batteries contained within housing 6. Because such batteries become discharged with use, it is necessary for data entry terminal 4 to be electrically chargeable by external means.

As seen in the preferred embodiment of FIG. 1, invention 2 comprises a generally upstanding frame 20 into which data entry terminal 4 is receivable. Frame 20 comprises opposing sidewalls 22 and 24 which are interconnected by rear wall 26. Front wall 28 of frame 20 is substantially shorter than rear wall 26 thereby avoiding interference with keypad 10 of data entry terminal 4. End wall 30 of frame 20 interconnects with sidewalls 22 and 24 and with front wall 28 and rear wall 26. Contact members 32 depend marginally from end wall 30. Rail 34 depends from rear wall 26 into cavity 36 within frame 20. Rail 34 engages the rear of data entry terminal 4 as it is inserted into frame 20, thereby urging data entry terminal 4 into proper position relative to front wall 28 of frame 20. Frame 20 resides in cradle 40 which rests upon support 42.

Support 42 is provided with a generally upstanding plate 42a mounted to base 46. Slotted opening 44 is provided in plate 42a to allow hanging of invention 2 upon a vertical surface if desired. Base 46 provides a structure to support invention 2 on a horizontal workbench or shelf, if preferred.

Plate 42a of support 42 is provided with opening 49 to receive plug means depending from a typical telephone wall mounting plate. Slotted opening 44 and slot 47 of plate 42a disposed to receive large-headed mounting studs typical of telephone wall mounting plates. Thus a user may leave invention 2 attached to a wall at a telephone wall plate and may attach telephone cabling through opening 49 to modulator-demodulator means which may interconnect through frame 20 to data entry terminal 4. When data intercommunication with a data collection device, or recharging thereof is desired, the device is placed within the invention 2 as it hangs from a wall, mounted to a telephone wall plate if desired.

Figure 5:
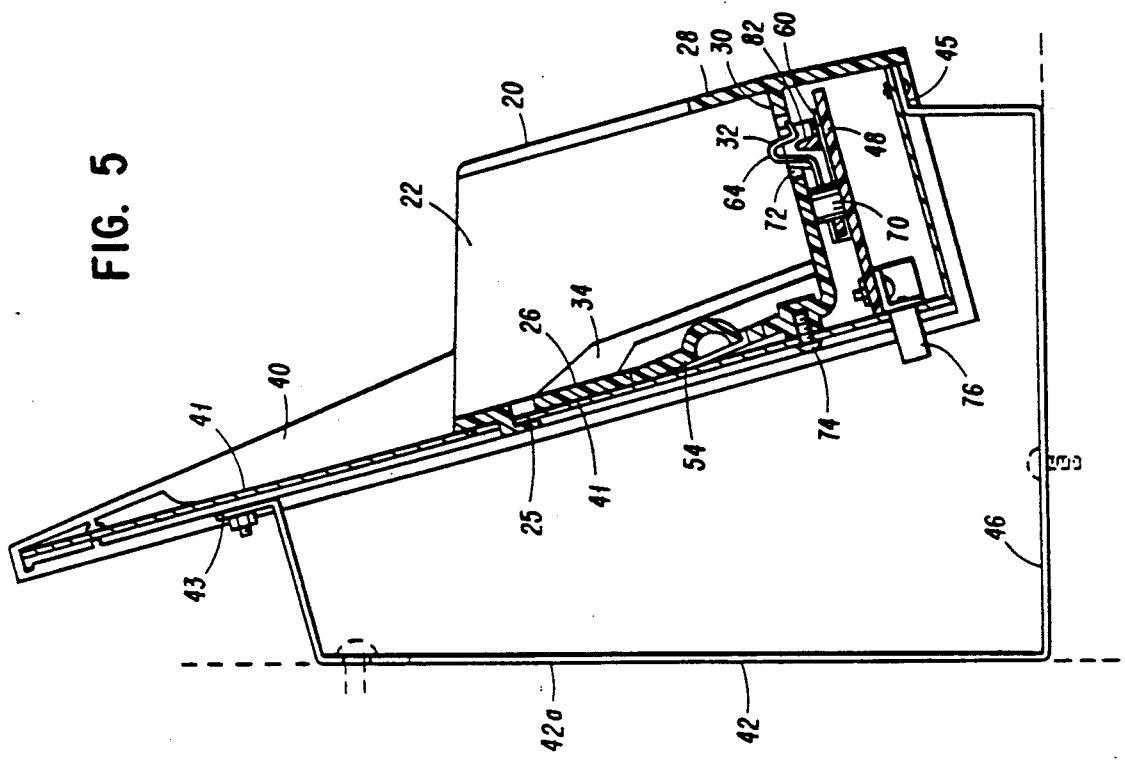
FIG. 5 is a view in section along lines 5—5 of FIG. 4.
Figure 4:
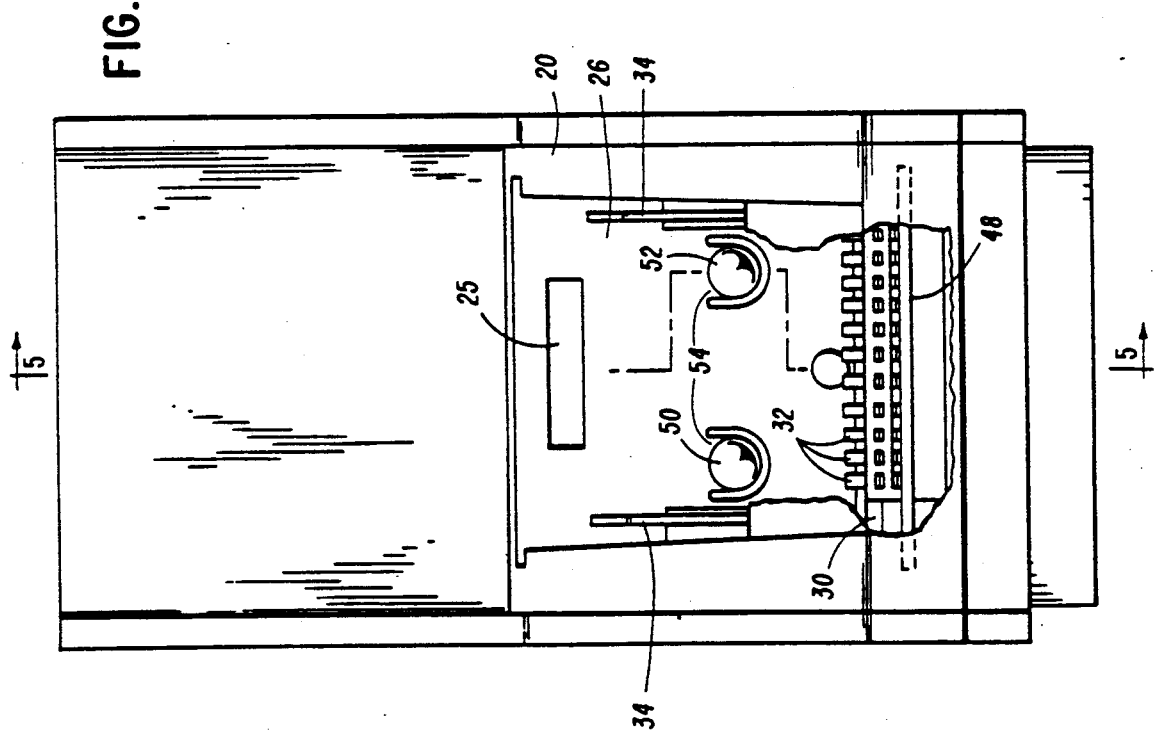
FIG. 4 is a front elevation of the embodiment of the invention shown in FIG. 1 with portions cut away.

Referring now to FIGS. 4 and 5, the structure of the preferred embodiment of invention 2 can better be visualized. Contact elements 32 are arranged in spaced apart fashion and are mounted at end wall 30 of frame 20 and extend therethrough. Lip 25 depends from the rear wall 26 to overhang rear wall 41 of cradle 40. Detents 50 and 52 rest on tabs 54 which are attached on one side thereof to rear wall 26 upon sloped region 27. This mode of attachment allows tabs 54 to deflect relative to rear wall 26. Detents 50 and 52 comprise mating elements for indentations formed in the rear of housing 6 of data entry terminal 4 and are positioned on rear wall 26 such that mating engagements with indentations on data entry terminal 4 are achieved when data entry terminal 4 is fully seated within frame 20. Electrical connector 76 provides an interconnection junction between circuit board 48 and external means and in the preferred embodiment comprises a pin containing shell housing well known as a DB-9, connector.

Figure 3:
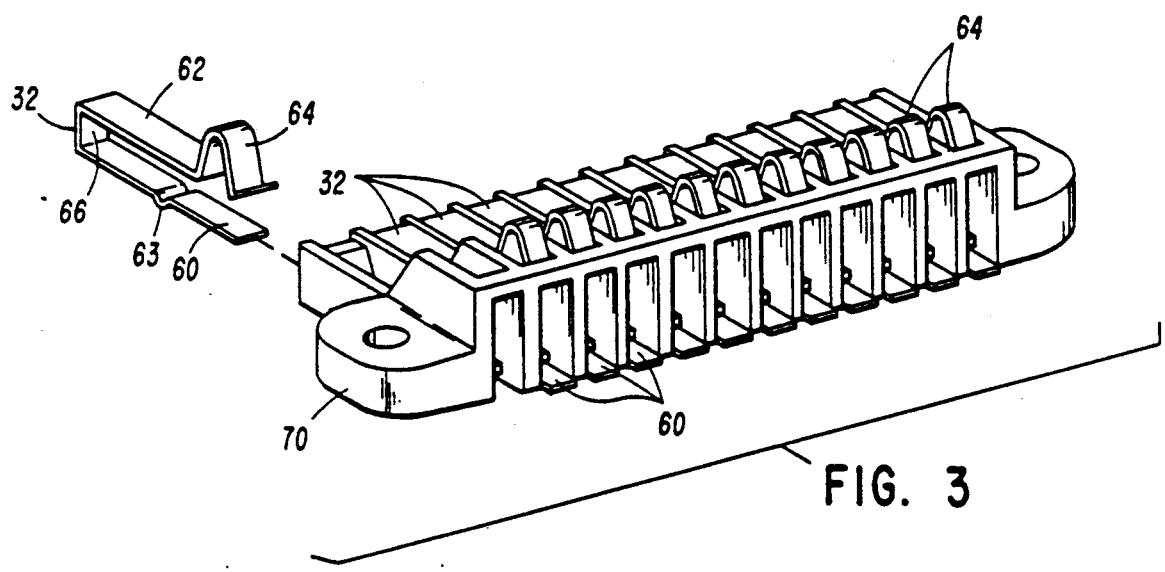
FIG. 3 is an enlarged view of the electrically conducting element receiving member of the invention with one of the elements displaced therefrom.

Referring to FIG. 3, a plurality of contact elements 32 are deployed within a contact receiving element 70 with one contact element 32 displaced therefrom for illustration of detail. Each contact element 32 comprises a formed conductive strip having a first leg 60. Free ended section 62 of contact element 32 is provided with a generally U-shaped area 64 therealong. First leg 60 and free ended section 62 are formed in generally parallel relationship separated by a reversing section 66. Contact elements 32 are constructed of electrically conductive material with sufficient resilience such that free ended section 62 will return to its generally parallel relationship to first leg 60 when not subjected to deflective force.

Each contact element 32 is fitted into contact receiving member 70 such that contact elements 32 are spaced apart in generally parallel relationship with U-shaped sections 64 depending thereabove. Free ended section 62 including U-shaped sections 64 are free to be deflected somewhat downward when contact elements 32 are positioned within contact receiving member 70. First leg 60 of contact element 32 is provided with a protrusion 63 upon the lower surface 61 thereof, said protrusion 63 establishing electrical contact with a conductive area upon circuit board 48, in FIG. 5, to which contact receiving member 70 is mounted.

Referring now in particular to FIG. 5, it can be seen that contact receiving member 70 mounts to circuit board 48 which is stationed below end wall 30 of frame 20 such that U-shaped sections 64 of contact elements 32 may protrude through opening 72 of end wall 30.

Cradle 40 carries frame 20, being mounted thereto by screw 74. Support 42 is mounted to cradle 40 at brackets 43 and 45 and is shaped to afford a pleasing recline to cradle 40. It can be seen that support 42 may be mounted by appropriate means to a vertical structure or to a horizontal structure at its base 46.

Figure 2:
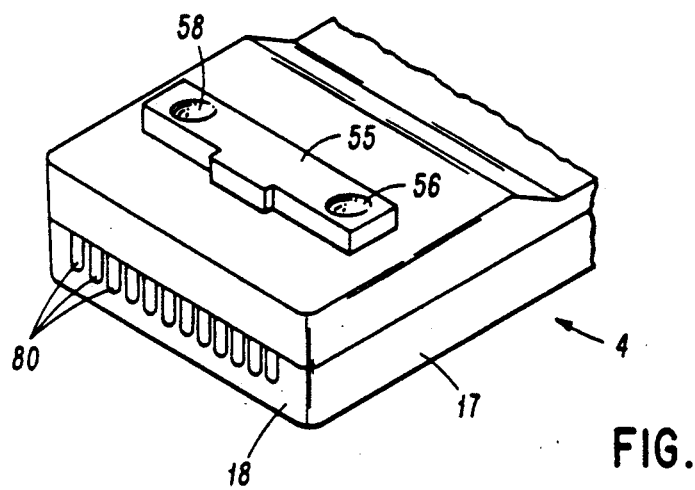
FIG. 2 is an enlarged perspective view of the contact end of a hand-held device employable with the invention.

FIG. 2 discloses, from the rear, the lower end 17 of housing 6 of the hand-held data entry terminal 4 of FIG. 1. Indentations 56 and 58 are provided on shoulder 55 on the rear of data entry terminal 4 disposed to receive detents 50 and 52 respectively when data entry terminal 4 is inserted in frame 20 and seated upon end wall 30 thereof. A plurality of contact pads 80 are positioned upon end wall 18 of data entry terminal 4. When data entry terminal 4 is properly positioned in frame 20, contact pads 80 of data entry terminal 4 engage contact elements 32 at U-shaped sections 64 thereof in generally overlying touching engagement. The engagement of contact pads 80 with contact elements 32 provides some deflection force in a generally downward direction upon contact elements 32 causing free ended section 62 to deflect. The deflection of free ended section 62 is limited by stop 82, which can be best seen in FIG. 5.

The employment of detents 50 and 52 in cooperation with indentations 56 and 58 permits frame 20 to be disposed in other than generally vertical orientation while still allowing retention of data entry terminal 4 in frame 20 with sufficient interengagement of contact pads 80 of data entry terminal 4 with contact elements 32 of invention 2.

Figure 6:
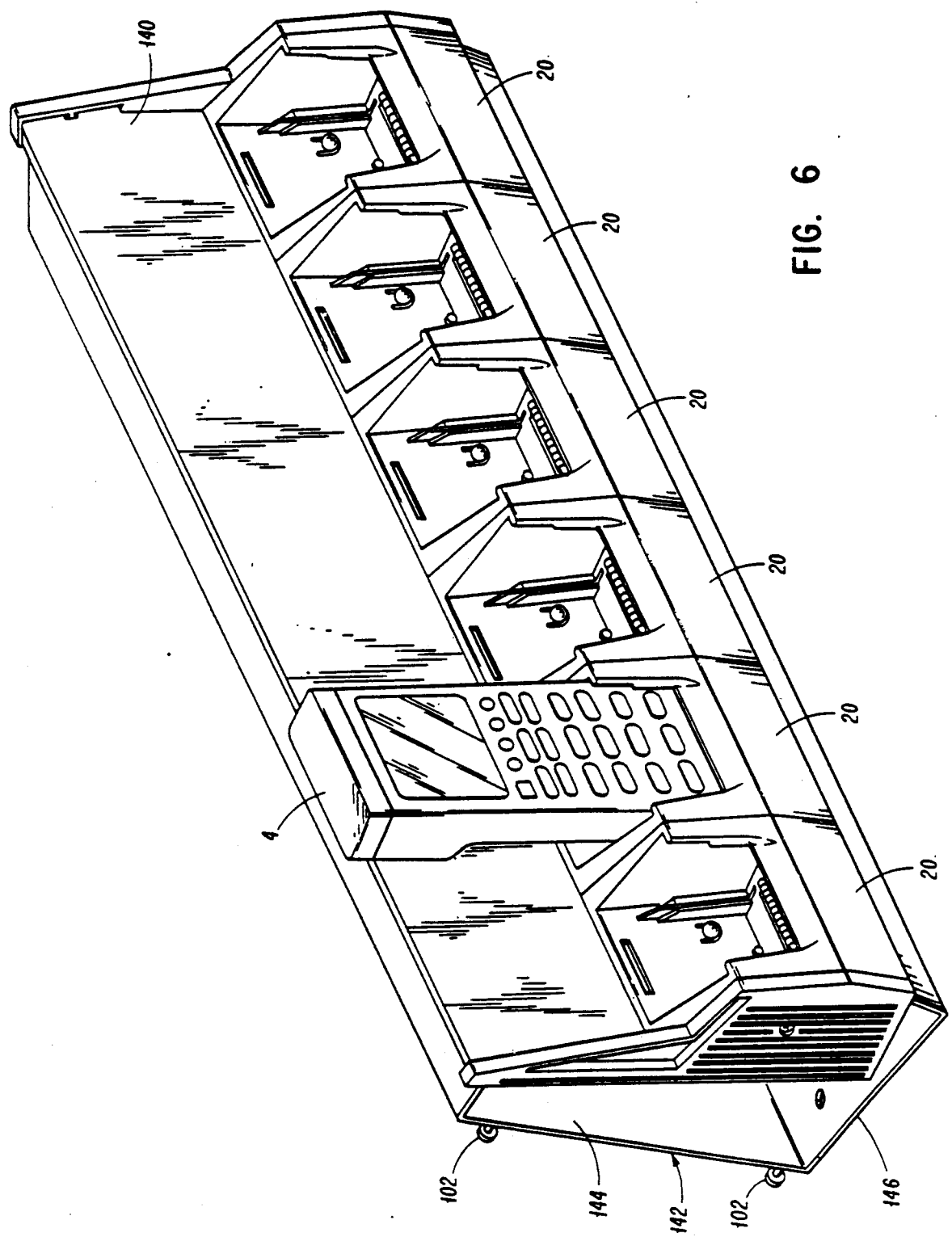
FIG. 6 is a perspective view of an alternative embodiment of the invention with a hand held device in one of the bays of the invention.

FIG. 6 discloses an alternative embodiment of the invention wherein a plurality of frames 20 are mounted within an elongated cradle 140 which in the embodiment shown has mounted thereto six of frames 20. A data entry terminal 4 may be placed in each of frames 20 of the device of FIG. 6, such that six data entry terminal units may be recharged or integrated with a data collection system at one time with this alternative embodiment. Each data entry terminal 4 may be selectively positioned in any of the frames 20 independently of any placement of other data entry terminals in any other frame 20 of cradle 140. Cradle 140 is supported at a slight recline by support 142 which comprises base 146 and upstanding wall 148. Mounting means 102 is optionally available to secure support 142 to a vertical structure, if desired.

OPERATION OF THE INVENTION

As the need arises to recharge the internal batteries of one or more data entry terminal 4, or to feed data to or collect data from said data entry terminal 4, the data entry terminal 4 may be placed in a frame 20 such that the contact pads 80 of end wall 18 of data entry terminal 4 engage and depress the contact elements 32 of end wall 30 of frame 20. Since contact pads 80 and contact elements 32 are electrically conductive, the engagement of a contact pad 80 with a contact element 32 provides a completed electrical pathway such that electrical charging or electrical communication between invention 2 and data entry terminal 4 may be accomplished.

Detents 50 and 52 of rear wall 26 of frame 20 engage mating indentations 56 and 58 on the rear of data entry terminal 4 such that sufficient mechanical rigidity is achieved between data entry terminal 4 and frame 20 to maintain solid engagement between contact pads 80 of data entry terminal 4 and contact elements 32 of frame 20.

Support 42 of invention 2 may be mounted to a vertical wall over a telephone mounting bracket having vertically spaced apart studs and a telephone jack which remains accessible through opening 49 of plate 48 support 42.

Once insertion of data entry terminal 4 is completed within frame 20, recharging of batteries and intercommunication of the data entry terminal with outside computing facilities may be achieved.

Having described the invention, I claim:

1. Apparatus for selectively receiving a portable data entry terminal device having an elongated body with a plurality of electrical contacts on the exterior of one end wall thereof, having data entry and display means on a front wall thereof, and having first elements of complementarily shaped first and second elements, said first elements disposed spacedly on the exterior of a rear wall of the body of the data entry terminal adjacent said one end wall with the electrical contacts thereon, the invention comprising
 a frame having at least one open side and having generally upstanding sidewalls, a rear wall interconnecting the sidewalls and an end wall adjacent said sidewalls and rear wall,
 a plurality of electrically conductive elements corresponding to the plurality of electrical contacts of the data entry terminal,
 means for fitting said plurality of electrically conductive elements in spaced apart interrelationship below said end wall of said elongated body of said portable data entry terminal device,
 said electrically conductive elements protruding through said end wall of said frame and being disposed to make touching contact engagement with the electrical contacts of the data entry terminal when said terminal is installed in said frame, and
 second elements spacedly and deflectively movably disposed on the rear wall of the frame, the second elements complementarily engageable with said first elements disposed on said data entry terminal device for engagement with said first elements of said data entry terminal device, whereby, upon placement of the data entry terminal device into the frame, said second elements deflectively move and engage respective ones of the first elements of the data entry terminal device for establishing mechanical rigidity between said data entry terminal device and said frame to maintain solid engagement between the electrical contacts of the data entry terminal device and the electrically conductive elements protruding through the end wall of the frame.

2. The apparatus of claim 1 wherein
said electrical contacts of said data entry terminal device deflect said electrically conductive elements when said electrical contacts engage said electrically conductive elements,
said electrically conductive elements return to their original disposition when said terminal device is removed from said frame.

3. The apparatus of claim 1 wherein
said second elements of said frame comprise one or more deflectable tabs correspondingly having one or more protrusions said tabs depending from the rear wall of said frame, and said first elements on the exterior of a rear wall of said body of said data entry terminal device being indentations,
said protrusions engaging said indentations of said body of said data entry terminal device when said data entry terminal is fully inserted in said frame.

4. The apparatus of claim 1 wherein
said frame is supported by a support member,
said support member comprising a base member and an upstanding plate,
said plate having at least one keyhole type opening therein,
said plate having an opening sized to receive a telephone jack mounted upon a telephone wall plate,
whereby said apparatus may be mounted to a telephone wall plate having at least one mounting stud and a telephone jack thereon.

5. The apparatus of claim 1 wherein
each of said electrically conductive elements comprising a pair of generally parallel legs interconnected by a formed section,
one leg of said pair of generally parallel legs of each of said electrically conductive elements having a U-shaped section,
said U-shaped sections of said one leg of each said electrically conductive elements engaging said electrical contacts of said data entry terminal device when said terminal is installed in said frame.

6. The apparatus of claim 5 wherein
said means for fitting said plurality of electrically conductive elements is a contact receiving member receiving said electrically conductive elements in spaced apart parallel relationship thereamong,
each of said electrically conductive elements being secured to said contact receiving member,
said U-shaped sections of said electrically conductive elements protruding from said contact receiving member,
said end wall of said frame having an opening therein to receive said U-shaped sections of said electrically conductive elements,
said contact receiving member mounted below said end wall of said frame, and disposed adjacent said opening in said end wall of said frame, such that said U-shaped sections of said electrically conductive elements extend through said opening.

7. The apparatus of claim 6 wherein
said electrical contacts of said data terminal device deflect said electrically conductive elements when said contacts engage said electrically conductive elements,
said electrically conductive elements return to their original disposition when said terminal device is removed from said frame.

8. The apparatus of claim 6 wherein said second elements of said frame comprise one or more deflectable tabs correspondingly having one or more protrusions, said tabs depending from the rear wall of said frame, and said first elements of said body of said data entry terminal device being indentations, said protrusions engaging said indentations of said body of said data entry terminal device when said data entry terminal device is fully inserted in said frame.

9. Apparatus for interchange of data with a remote data collection terminal, the invention comprising:

a hand-held data entry terminal device capable of storage of data therein, said hand-held data entry terminal device storing data provided thereto by electrical means, said hand-held data entry terminal device having an elongated body with a rear wall and end wall at one end of said rear wall, said rear wall having first elements for engagement with complementarily shaped second elements and said end wall of said hand-held data entry terminal device having a plurality of spaced apart electrically conductive elements mounted thereon, said electrically conductive elements being electrically connected to internal circuits of said hand-held data entry terminal device, a hand-held data entry terminal receiving dock comprising, a frame having at least one open side and having generally upstanding sidewalls, a rear wall of the frame interconnecting adjacent ones of the sidewalls and a lower wall adjacent the side wall and the rear wall of the frame, said rear wall of the frame having second elements disposed on the rear wall of the frame and deflectively movable into and out of the rear wall of the frame, said second elements movable into engagement with the first elements of said hand-held data entry terminal device upon installation of said hand-held data entry terminal device into the frame, said lower wall having disposed thereon in spaced apart interrelationship a plurality of electrically conductive members, said electrically conductive members of said lower wall disposed to make touching contact engagement with the electrically conductive elements of said hand-held data entry terminal device when said hand-held data entry terminal is selectively installed in said frame and said first elements of said hand-held data entry terminal device engage said second elements to establish a mechanically rigid position between the hand-held data entry terminal device and said frame to maintain solid engagement between the electrically conductive members of said lower wall and the electrically conductive elements of said hand-held data entry terminal device, and means for coupling said electrically conductive members of said lower wall to said electrical means, whereby the hand-held data entry terminal device becomes enabled to exchange data with a remote data collection terminal device.

10. The apparatus of claim 9 wherein
said electrically conductive elements of said data entry terminal device deflect said electrically conductive members when said electrically conductive elements engage said electrically conductive members, said electrically conductive members return to their original disposition when said terminal device is removed from said frame.

11. The apparatus of claim 9 wherein
said second elements of said frame comprise one or more deflectable tabs correspondingly having one or more protrusions, said tabs depending from the rear wall of said frame, and said first elements of said body of said hand-held data entry terminal device being indentations, said protrusions engaging said indentations of said body of said hand-held data entry terminal device when said data entry terminal is fully inserted in said frame.

12. The apparatus of claim 9 wherein
each of said electrically conductive members comprising a metallic strip formed into a pair of generally parallel legs, one leg of said pair of generally parallel legs of each of said elongated electrically conductive members having a U-shaped section, said U-shaped sections of the legs of said electrically conductive members engaging said electrically conductive elements of said hand-held data entry terminal device when said terminal device is installed in said frame.

13. The apparatus of claim 12 wherein
a contact receiving member receiving said electrically conductive members in spaced apart relationship, each of said electrically conductive members being secured to said contact receiving member, said U-shaped sections of said electrically conductive members protruding from said contact receiving member, said contact receiving member mounted below said lower wall of said frame, said lower wall of said frame having an opening therein to receive said U-shaped sections of said electrically conductive members.

14. The apparatus of claim 12 wherein
said electrically conductive elements of said data entry terminal device deflect said electrically conductive members when said electrically conductive elements engage said electrically conductive members, said electrically conductive members return to their original disposition when said data entry terminal device is removed from said frame.

15. The apparatus of claim 12 wherein
said second elements of said frame comprise one or more deflectable tabs correspondingly having one or more protrusions, said tabs depending from the rear wall of said frame, and said first elements of said rear wall of said hand-held data entry terminal device being indentations, said protrusions engaging said indentations of said body of said hand-held data entry terminal device when said data entry terminal device is fully inserted in said frame.

16. Apparatus for selectively receiving a plurality of portable data entry terminal devices, each having an elongated body with a plurality of electrical contacts on the exterior of one end wall thereof and having entry and display means on a front wall thereof, and having first elements of complementarily shaped first and second elements, said first elements disposed spacedly on the exterior of a rear wall of the body of each data entry terminal device adjacent said one end wall with the electrical contacts thereon, the invention comprising a plurality of frames,
each frame having at least one open side and having generally upstanding sidewalls, a rear wall and an end wall,
said end wall of each of said frames having disposed thereat in spaced apart interrelationship a plurality of electrically conductive elements,
said electrically conductive elements disposed to make touching contact engagement with the electrical contacts upon said data entry terminal devices when one or more of said data entry terminal devices is selectively installed in said plurality of frames, and
second elements spacedly and deflectively movably disposed on the rear wall of each frame, the second elements complementarily engageable with said first elements disposed on said data entry terminals for engagement with said first elements of said data entry terminals upon installation of said data entry terminals into the frames, said second elements deflectively moveable to engage respective ones of the first elements of the data entry terminal for establishing mechanical rigidity between said data entry terminal and said frame to maintain solid engagement between the contacts of the data entry terminal and the electrically conductive elements of the respective frames,
an elongated cradle for mounting the plurality of frames adjacent one another,
said plurality of frames mounted adjacent one another within said elongated cradle, and
a support bracket extending the length of the cradle the support bracket having a base and an upstanding wall.

17. The apparatus of claim 16 wherein
said electrical contacts of each of said data entry terminal devices deflect said electrically conductive elements of said frames into which said data entry terminal devices are received,
said electrically conductive elements return to their original disposition when said data entry terminal devices are removed from said plurality of frames.

18. The apparatus of claim 16 wherein
each of said frames having one or more protrusions depending from the rear wall thereof,
said protrusions engaging indentations of said body of a data entry terminal device when said data entry terminal device is fully inserted in one of said frames.

19. The apparatus of claim 16 wherein
said electrically conductive elements comprising formed elongated strips,
each of said elongated strips comprising a pair of generally parallel interconnected legs,
one of said pair of generally parallel legs of each of said strips having a U-shaped section,
said U-shaped sections of said strips engaging said electrical contacts of said data entry terminal devices when said terminal devices are installed in said frames.

20. The apparatus of claim 19 wherein
each of said frames has a contact receiving member associated therewith,
each of said contact receiving members receiving said elongated strips of said associated frame in spaced apart parallel relationship,
each of said strips being secured to said contact receiving member,
said U-shaped sections of said strips protruding from said contact receiving member,
said contact receiving members mounted adjacent said lower walls of said frames,
said lower walls of said frames having an opening therein to receive said U-shaped sections of said strips.

21. Data terminal recharging and data retrieval docking apparatus comprising:
at least one frame for receiving one end of an elongate data terminal having a housing including a plurality of spaced contacts at said one end thereof and retaining means disposed externally of said housing, said at least one frame having spaced, opposed sidewalls and front and rear walls for receiving the data terminal longitudinally within a space defined by said sidewalls and front and rear walls, and an end wall adjacent the sidewalls and front and rear walls;
a plurality of conductive elements mounted in spaced relationship beneath said end wall, each such element including a contact portion extending upwardly through said end wall, said contact portion being resiliently downwardly deflectable to return to said upwardly extending position when not subject to a deflective force, the upwardly extending contact portion disposed to engage and become deflected downwardly by a selected one of the plurality of the spaced contacts at the one end of the data terminal upon insertion of the data terminal into the at least one frame;
means disposed on said rear wall to engage said retaining means during the insertion of the data terminal into said at least one frame for locating said retaining means relative said end wall, said locating means and retaining means cooperating to position and retain the data terminal and each of said contacts of said data terminal in engagement with respective ones of said contact portions of said conductive elements against the resilient force of said conductive elements; and
connector means, disposed beneath said end wall of said at least one frame, for coupling said conductive elements to battery recharging and data communications means, whereby said data terminal becomes coupled to said recharging and data communications means upon being inserted into said at least one frame.

22. Data terminal recharging and data retrieval apparatus according to claim 21, wherein:
said means disposed on said rear wall comprises a pair of tabs each tab attached at one side to the rear wall to deflect with respect to the rear wall, each tab supporting a detent; and
said retaining means comprises a pair of indentations formed at the rear of said housing of the data terminal and disposed external of the housing at a rear wall thereof to become engaged with and seated with respect to the respective detents on said tabs during the insertion of the data terminal into said at least one frame for locating said retaining means relative said end wall, said detents and indentations cooperating to position and retain the data terminal and each of said contacts of said data terminal in alignment with respective ones of said contact portions of said conductive elements against the resilient force of said conductive elements.

23. Data terminal recharging and data retrieval apparatus according to claim 22, wherein
the apparatus further comprises a cradle for supporting said at least one frame, and a support member supporting said cradle, said support member including a base member and an upstanding plate, said plate having at least one slotted opening and an opening for receiving a telephone jack mounted upon a telephone wall plate, the at least one slotted opening adapting said support member to become mounted upon a telephone wall plate.

24. Data terminal recharging and data retrieval apparatus according to claim 22, wherein:
connector means comprises a circuit board mounted to said at least one frame beneath said end wall and a contact receiving element mounted to the circuit board, the contact receiving element retaining the conductive elements in spaced, parallel relationship;
an electrical connector coupled to said circuit board, for interconnecting said conductive elements to battery recharging and data communications means, whereby said data terminal becomes selectively coupled to said recharging and data communications means upon being inserted into said at least one frame.

25. Data terminal recharging and data retrieval apparatus according to claim 24, wherein
the apparatus further comprises a cradle for supporting said at least one frame, and a support member supporting said cradle, said support member including a base member and an upstanding plate, said plate having at least one slotted opening and an opening for receiving a telephone jack.

26. Data terminal recharging and data retrieval apparatus according to claim 25, wherein said cradle is adapted to receive a plurality of frames, and the at least one frame is a plurality of frames, the frames being supported adjacent one another within the cradle.

27. Data terminal recharging and data retrieval apparatus according to claim 26, wherein said plurality of frames comprises at least six frames, and wherein said data terminal may be selectively positioned in any of said at least six frames such that simultaneously, at least six data terminals may be recharged or coupled to a data collection system.

28. Data terminal recharging and data retrieval docking apparatus comprising:
at least one frame for receiving one end of an elongate data terminal device having a housing including a plurality of spaced contacts at said one end thereof and retaining means disposed on an exterior side of said housing, said at least one frame having a rear wall and an end wall interconnecting with said rear wall;
means for receiving said data terminal device inserted into said frame along said rear wall toward said end wall;
a plurality of conductive elements mounted in spaced relationship beneath said end wall, each such element including a contact portion extending upwardly through said end wall, said upwardly extending contact portion disposed to engage a selected one of said plurality of the spaced contacts at the one end of the data terminal device upon insertion of said data terminal device into said at least one frame;
means for resiliently deflecting said contact portions of said conductive elements upon engagement with the spaced contacts at the one end of the data terminal device upon said insertion of said data terminal device into said at least one frame;
means disposed on said rear wall to engage said retaining means during the insertion of said data terminal device into said at least one frame and for locating said retaining means relative said end wall, said locating means and retaining means cooperating to position and retain the data terminal device and each of said contacts of said data terminal device in engagement with respective ones of said contact portions of said conductive elements against a resilient deflection force of said contact portions of said conductive elements; and
means for coupling said conductive elements to battery recharging and data communications means, whereby said data terminal device becomes coupled to said recharging and data communications means upon being inserted into said at least one frame.

29. Data terminal recharging and data retrieval apparatus according to claim 28, wherein:
said means disposed on said rear wall comprises a pair of tabs each tab attached at one side to the rear wall to deflect with respect to the rear wall, each tab supporting a detent; and
said retaining means comprises a pair of indentations formed in the rear of said housing of the data terminal and disposed on the exterior side of the housing on a rear wall thereof to become engaged with and seated with respect to the respective detents on said tabs during the insertion of the data terminal into said at least one frame for locating said retaining means relative said end wall, said detents and indentations cooperating to position and retain the data terminal and each of said contacts of said data terminal in alignment with respective ones of said contact portions of said conductive elements against the resilient force of said conductive elements.

30. Data terminal recharging and data retrieval apparatus according to claim 29, wherein:
the apparatus further comprises a cradle for supporting said at least one frame, and a support member supporting said cradle, said support member including a base member and an upstanding plate, said plate having at least one slotted opening and an opening for receiving a telephone jack; and
said cradle is adapted to receive a plurality of frames, and the at least one frame is a plurality of frames, the frames being supported adjacent one another within the cradle.

31. A data terminal recharging and data retrieval docking system comprising:
at least one frame for receiving an end portion of an elongate data terminal device having a longitudinal axis and having a series array of spaced contacts including outer contacts and intermediate contacts between the outer contacts disposed transversely to said longitudinal axis and forming part of the exterior surface of said end portion and having retaining means providing indentations as part of the exterior surface of said end portion, said at least one frame having a rear wall and an end wall interconnecting with said rear wall;

receptacle defining means comprising said rear wall and end wall defining a receptacle for receiving said end portion of said data terminal device inserted into said frame along said rear wall toward said end wall;

a series array of conductive elements mounted in spaced relationship by said receptacle defining means, each such element including a contact portion extending into said receptacle, said contact portion being disposed to engage a respective one of said series array of the spaced contacts of the data terminal device upon insertion of said data terminal device into said at least one frame;

device engagement means for reliably retaining the contact portions of said series array of conductive elements in pressure engagement with the respective ones of said series array of spaced contacts of the data terminal device without any positive latching of the device in the receptacle, upon said insertion of said data terminal device into said at least one frame, while accommodating removal of the terminal device solely by manual grasping and direct axial withdrawing thereof;

said device engagement means comprising locating elements of said receptacle defining means configured to interfit with the indentations provided by said retaining means during the insertion of said data terminal device into said at least one frame and for locating said end portion of said terminal device in a final retained position relative to said receptacle, said locating elements and said indentations provided by said retaining means cooperating to retain each of said series array of contacts of said data terminal device in engagement with respective ones of said contact portions of said series array of conductive elements in said final retained position while accommodating immediate manual gripping and direct axial removal of the terminal device from its final retained position without any antecedent unlatching or terminal device shifting step.

* * * * *